Dec. 13, 1932.   M. FRÄNKL   1,890,646
PROCESS FOR SEPARATION OF GAS MIXTURES, ESPECIALLY OF AIR
Filed Jan. 16, 1926    2 Sheets-Sheet 1

Inventor:
MATHIAS FRÄNKL
BY
ATTORNEYS

Dec. 13, 1932.  M. FRÄNKL  1,890,646
PROCESS FOR SEPARATION OF GAS MIXTURES, ESPECIALLY OF AIR
Filed Jan. 16, 1926    2 Sheets-Sheet 2

Inventor:
MATHIAS FRÄNKL
BY
Richards & Geier
ATTORNEYS

Patented Dec. 13, 1932

1,890,646

UNITED STATES PATENT OFFICE

MATHIAS FRÄNKL, OF AUGSBURG, GERMANY, ASSIGNOR TO AMERICAN OXYTHERMIC CORPORATION, OF NEW YORK, N. Y., A CORPORATION OF DELAWARE

PROCESS FOR SEPARATION OF GAS MIXTURES, ESPECIALLY OF AIR

Application filed January 16, 1926, Serial No. 81,723, and in Germany January 16, 1925.

My invention relates to the separation of gaseous mixtures, and has for one of its objects to provide a process and apparatus for separating components of a gas mixture in an efficient manner and with a minimum expenditure of power, thereby reducing the cost of producing one or a plurality of such components having the desired degree of purity.

The power required for separating a gas mixture, such as air, into components by liquefaction and rectification, is practically always expended in an initial compression of the gas mixture. The amount of power thus required depends upon several factors, viz., cold losses resulting from incomplete use of the cold of the outgoing separated components; the leak of heat into the apparatus; the necessity for the condensation either of the original air or of a more or less nitrogen-enriched portion thereof by thermal contact with a liquefied portion; and the quantity of air compressed initially. As is well known, air liquefies under atmospheric pressure at a temperature of about $-192°$ C., and oxygen liquefies at a temperature of about $-183°$ C. So that air can be condensed by evaporation of oxygen, allowing a small difference of temperature between the condensing vapor and the evaporating liquid only when the air is compressed to a pressure of 4 to 5 atmospheres. When, therefore, all of the air to be separated is thus liquefied, the entire volume of air must be compressed to 4 to 5 atmospheres pressure.

The pressure necessary for total liquefaction of a gaseous mixture, such as air, by thermal contact with its more readily condensible constituent, namely oxygen under one atmosphere pressure, is much higher than is the case when only a portion of the compressed air is liquefied in contact with pure liquid oxygen. Because of this, some prior processes are characterized by the fact that only that quantity of the mixture to be treated is compressed which is necessary to provide the washing or reflux liquid, the remainder of the mixture being introduced into the rectifying column at low pressure. The compressed mixture is then liquefied in an evaporator by evaporation of the higher boiling component. The other portion of the mixture which is blown in at low pressure, on the other hand, is available for and is subjected to rectification.

In such processes, however, the usual counter-current tubular heat exchangers are not satisfactory for the heat exchange of, for example, noncompressed air or air of low pressure, and this is more particularly so if the products of separation part cipating in the heat exchange, as well as the mixture to be separated, are not greatly compressed.

It is an object of the present invention to provide a novel process for the separation of gas mixtures into components whereby the difficulties heretofore encountered in effecting heat exchange between the gas mixture and its separated products are avoided, greater heat-exchange efficiency attained, and operation at lower pressures made possible, so that the power consumption is considerably reduced. I accomplish such object by effecting the transfer of the cold of at least one of the separated components to the incoming gas mixture by regenerative cold exchange utilizing a cold accumulator which, by periodic reversal in rapid sequence operates alternately also as a cold exchanger to transfer the cold stored therein to the incoming gas mixture, as will be explained more fully hereinafter.

In the accompanying drawings several forms of apparatus for carrying out my improved process are represented diagrammatically by way of example.

In said drawings—

The apparatus (Fig. 1) includes the laminated cold regenerators A' and A'' which operate alternately as cold accumulators and cold exchangers, the reversing device $e$, the condenser and oxygen evaporator $b$, and the rectifier $c$ with the regulating valve for the wash liquid or reflux $d$, $g'$, $h'$, $i'$, $k'$, $l'$, $z'$ and $g''$, $h''$, $i''$, $k''$, $l''$, $z''$ are check-valves. (In the present specification and claims, in order to avoid roundabout and involved expressions, the word "cold" will be used in a substantive or positive sense, even though from the strictly scientific viewpoint cold merely signifies the absence of heat.)

Figure 1:
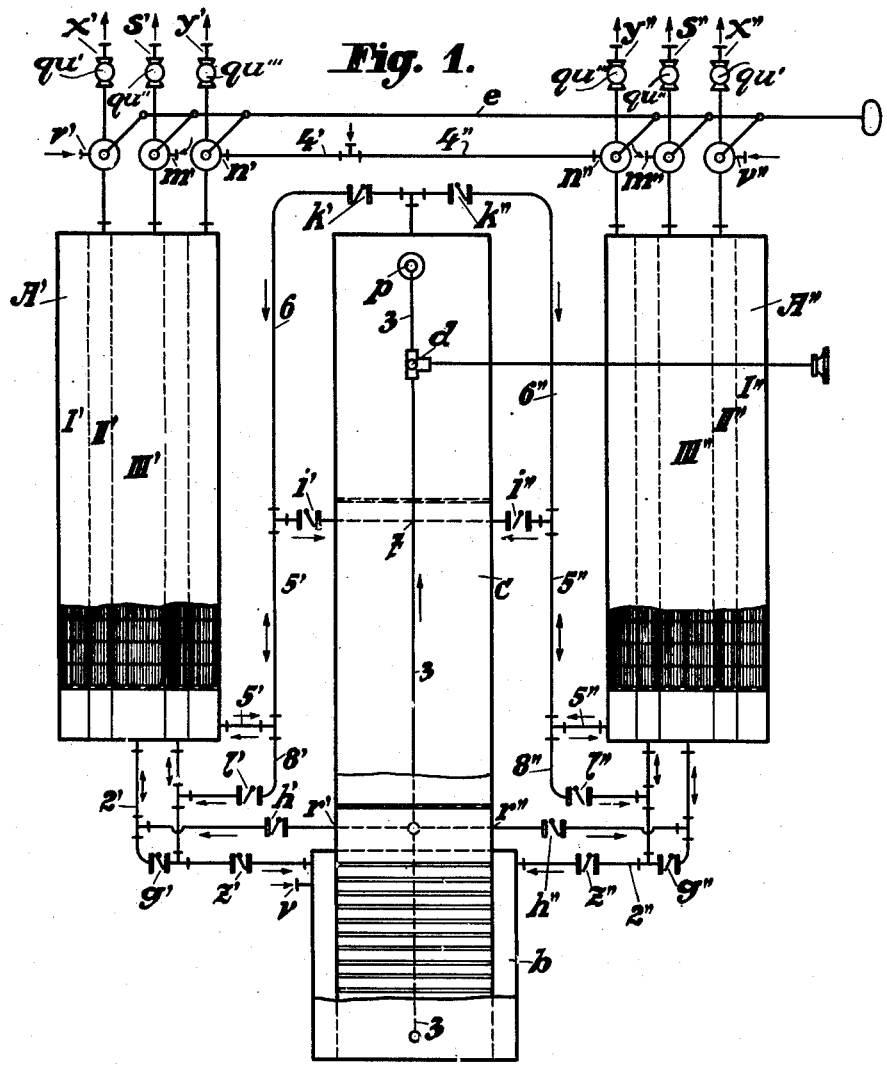
Figure 1 illustrates an apparatus having cold accumulators provided by way of example with three sections for separating a component gas having a high degree of purity from a mixture, as oxygen of about 98% purity, from air.

The cold exchangers A' and A'', which are constructed in the form of a cold accumulator, may be subdivided into two sections or divisions when it is desired to obtain oxygen of low purity, and into three divisions for plants designed to produce a high purity. Figure 1 illustrates a process and a plant for producing oxygen of high purity. The two sections II and III of each accumulator alternately receive the heat of the compressed air at the beginning of the process, and section III takes up the cold of the separated oxygen upon reversal, as described hereinafter. Section or division I serves initially for reception of the heat of the input low pressure air on its way into the apparatus and of the cold of a part of the separated nitrogen on its way out of the apparatus. The other part of the cold of the separated nitrogen is taken up by section II.

Through the sections III and II of the regenerators A' or A'' operating at a given period as cold exchangers compressed air is alternately introduced, said compressed air, after liquefaction, serving in the upper part of the rectifier $c$ as a washing liquid in order to wash out the oxygen of the blown-in or low pressure air. A liquid may thereby be produced in the rectifier having a content of 47% oxygen. From this liquid the nitrogen may be vaporized by means of oxygen vapors arising at the evaporator, while the oxygen in turn is condensed. The oxygen passes out through section III of the cold accumulator after having been vaporized again in the evaporator. Of the separated nitrogen a part will be conveyed through section II and the other part through section I of the cold accumulators. When the flow is reversed, therefore, the several sections of the cold accumulators or exchangers always serve as passages for another kind of gas than during the immediately preceding period, for initially the section I conducts the input low pressure air, and the sections II and III the more highly compressed air, while on reversal, section III conveys oxygen and sections II and I nitrogen. The available heat content of gas passing on reversal should in every individual section correspond to the available heat content of gas which previously passed through such section in an opposite direction, because otherwise one section may gradually become too cold and another too warm. The available cold content of oxygen passing on reversal through the middle section III should be at least as large as the available heat content of air which had previously passed, and the available cold content of nitrogen returning through the sections II and I should be at least equal to the available heat content of air which had previously passed through these sections.

There may, for instance, be introduced 2000 cubic meters of blown-in air through section I, 1000 cubic meters of more highly compressed air through section II, 500 cubic meters of compressed air through section III, while 1000 cubic meters of separated nitrogen are returned through section II, 500 cubic meters of separated oxygen through section III and 2000 cubic meters of nitrogen through section I. To obtain this result the outflowing gas quantities are regulated by means of throttle valves $qu'$, $qu''$ and $qu'''$.

There may also be introduced at V from an expansion-refrigerating machine an additional quantity of 120 cubic meters of liquid air for the purpose of making up the losses of cold in the cold accumulators or exchangers. These losses arise mainly in the outer sections I, because heat can enter these sections from the outside, which is not so much the case with the inner sections.

The cold exchangers are constructed to serve also as accumulators (regenerators) and are arranged for reversed operation. The cold exchangers may be filled with a regenerative body as a metallic packing in the form of layers of corrugated sheet metal e. g. of 1 mm. thickness which are so positioned that the several layers, each of a height of e. g. about 25 mm., are in contact with each other only by means of interposed iron rods which serve to check the metallic conduction of the cold. The air blown in, or as the case may be, the more highly compressed air, may thus be conveyed through the regenerators without excessive resistance, and an extensive contact of the air with the metal surfaces is assured due to the short distance between the corrugated laminæ of sheet metal. The regenerators, accordingly, are provided with a regenerative body or mass of large surface area, good heat conductivity, and having substantial heat storage capacity. In operation at least one of the chilled separated gas components is passed in heat exchange contact relation with the regenerative bodies whereby its cold is transferred to such bodies, and then a subsequent charge of the input gas mixture is passed in heat exchange contact relation with the same surface of the regenerative bodies whereby such input gas is chilled by the cold stored in the bodies. More particularly, input air is chilled by flowing the same in one direction in intimate heat exchange contact with one regenerative mass, and simultaneously a separate similar regenerative mass is chilled by flowing one of the cold separated components therethrough in relatively opposite direction and in intimate heat exchange contact therewith.

With this new laminated cold accumulator for example up to 1000 sq. m. heat-exchange surface may be provided in one cubic meter space of the accumulator, said space having only 5 sq. m. jacket surface. In this way, the losses of cold are reduced to a minimum, and likewise the power required to make up the losses of cold. For a plant having a yield of 2000 cubic meters separated nitrogen according to my invention only 90 H. P. will be required in addition to the power required for the compression of the air to the condenser pressure. The total power required for such a plant will amount to 240 H. P., which is materially less per cubic meter of separated nitrogen, than is required by existing plants operating according to known processes.

My improved process may be carried out as follows, reference being had to the apparatus shown in Figure 1:

The air which is compressed to a pressure of about 4 atmospheres enters the sections III′ and II′ of the regenerator or cold accumulator A′ at $m'$ and $v'$ and is cooled to a temperature of approximately −180° C.

The cooled but not yet liquefied compressed air is carried through the conduit 2′ into the condenser $b$ and is therein liquefied by the evaporation of liquid oxygen. It is then conveyed by the conduit 3 to the top of the rectifying column.

Simultaneously with the introduction of compressed air into the sections III′ and II′ of the regenerator, air (not under super-atmospheric pressure) is blown into section I′ at the point $n'$ through the conduit 4′, cooled down to approximately −180° C. by the cold accumulator and introduced by means of the conduit 5′ at the point $t$ into the rectifying column $c$ at about the middle point. This low pressure air travels upwardly in the rectifier in counter-current relation to the liquid air trickling down, whereby the oxygen of the gaseous air is for the greater part washed out by the nitrogen contained in the liquid air, and the liquid nitrogen is vaporized by the gaseous oxygen rising from the evaporator. Finally the nitrogen escapes at the top of the rectifier and passes through conduits 6″ and 5″ to the section I″ and through conduit 8″ to section II″ of accumulator A″ wherein it gives up its cold. The oxygen flows into the evaporator in the form of a liquid where it is again vaporized with accompanying liquefaction of air, escapes through conduit $r''$ and is withdrawn at $s''$ through section III″ of accumulator A″ which now accumulates cold in its three sections.

Now the operation of the plant is reversed and the air which is compressed to about 4 atmospheres is introduced into sections III″ and II″ of the regenerator A″ at $m''$ and $v''$, this regenerator acting now as a cold exchanger to give up its cold to the air.

In like manner air is blown at $n''$ into the section I″ through the conduit 4″, whereupon all gases will move in the above-described way through the apparatus in reversed direction.

The operation of the apparatus is periodically reversed in rapid sequence at intervals of e. g. about five minutes, in order to enable the regenerator, which in the previous cycle acted as an accumulator, to again give off the cold stored up therein to the subsequently entering air, while the regenerator, which in said previous fraction of the cycle acted as a cold exchanger, now accumulates or stores the cold of the separated oxygen and nitrogen. Only the evaporator and the rectifier work uniformly continuously. This periodical reversal results in changing the paths of air and the components with respect to the regenerative bodies so that each of these bodies has an interval of chilling the ingoing air and another interval of being chilled by an outgoing separated component. The frequency of such periodical reversals is such that, during operation, the temperature gradient from the cold to the warm end of the regenerative masses is a maximum and preferably such that the coldest portions of the regenerated masses remain at a temperature which approaches the entering temperature of the separated cold component while the outgoing temperature of such component closely approaches the entering temperature of the gas mixture. The reversing may be accomplished automatically by time limit switches which may be operated by compressed air.

The oxygen discharges alternately at the points $r'$ and $r''$ from the rectifier and is discharged from the plant at the points $s'$ and $s''$, while the nitrogen discharges at the points $y'$ and $x'$ and at the points $y''$ and $x''$.

The check-valves $g'$, $h'$, $i'$, $k'$, $l'$ and $z'$ and also $g''$, $h''$, $i''$, $k''$, $l''$ and $z''$ serve to prevent short-circuiting of the gas path and to insure that, on the one hand, the blown-in air takes the path from the regenerator acting as cold exchanger through the rectifier $c$ upwardly, instead of traveling transversely to the same along the path of least resistance into the other regenerator now acting as a cold accumulator, and also to insure that, on the other hand, the air which has been compressed to condenser pressure does not, instead of condensing in such condenser at super-pressure, flow immediately through the other regenerator (acting now as cold accumulator), which, at this time, is without pressure, in place of the oxygen.

By this arrangement of check-valves it is made possible to locate the reversing valves at the air entry or nitrogen and oxygen exit side, that is, at the warmer end of the apparatus. Without these check-valves the reversing valves would have to be arranged in the cold zone, namely at the connection between the cold accumulators and the rectifier and condenser or evaporator, which would, however, be less practicable as these complicated mechanisms would be quite inaccessible in the low temperature zones and would very soon cause disturbances in the operation.

Instead of the three-section cold accumulators, the three sections may also be constructed in such a manner that they are adjacent to each other, each forming an independent apparatus or regenerator unit.

Figure 2:
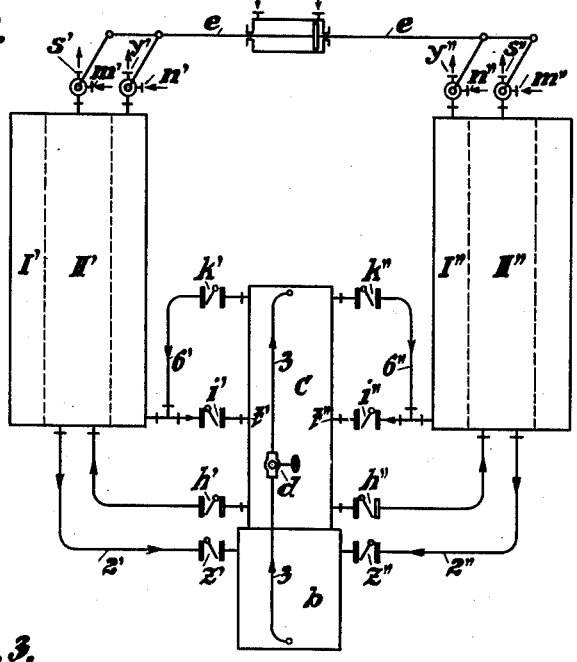
Figure 2 shows a similar apparatus wherein, however, the accumulators are provided with only two sections for separating a component gas having a lower degree of purity, as oxygen of about 47% purity, from air.

If the oxygen of e. g. 47% purity is to be produced, the regenerators may be constructed with only two sections, as shown in Figure 2. This construction differs from that of Figure 1 only in that the sections III' and III'' of the regenerators are dispensed with as they are not necessary for the production of oxygen of low purity.

Figure 3:
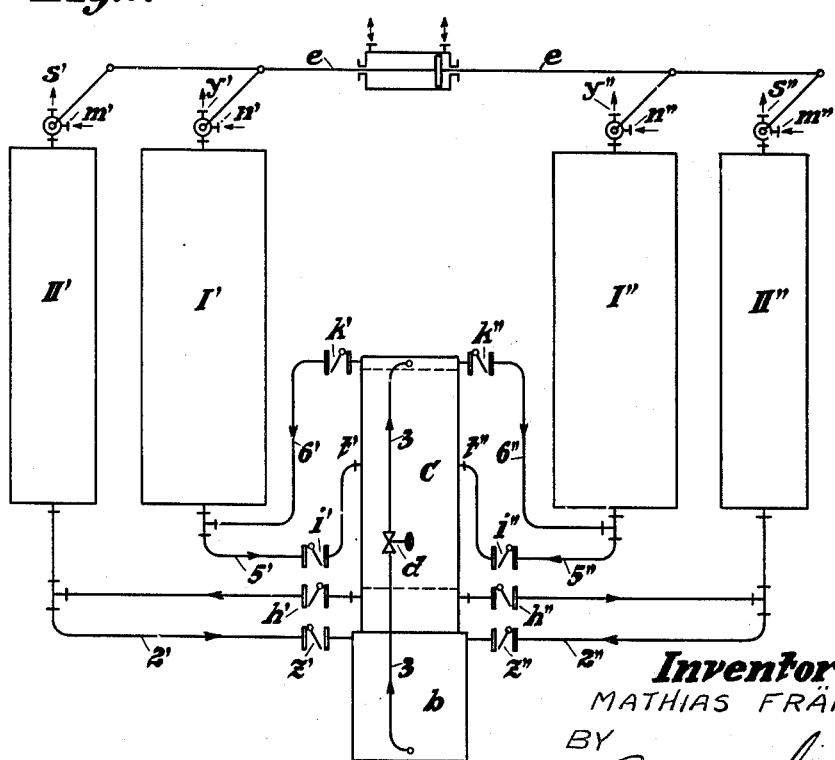
Figure 3 illustrates an apparatus similar to that shown in Figure 2, but with the accumulator sections arranged as separate units adjacent to each other.

The two sections of the regenerators shown in Figure 2 may also be arranged as separate units adjacent to each other. Such construction is shown in Figure 3 and corresponds in principle with that shown in Figure 2 with the exception that two separate regenerator units are employed in place of each partitioned regenerator. The two-part construction, instead of the three-part construction, is in this case possible for the reason that when producing low purity oxygen of e. g. 47% the same quantity of oxygen leaves the one section of the accumulator as previously was introduced in the form of compressed air (while when producing oxygen of high purity only about ⅓ returns) and just as much nitrogen leaves the outer section as previously blown-in air was introduced.

The periodically reversed operation of the cold accumulators or regenerators has a further great advantage over the operation with continuous exchange of cold. The removal of deposited substances may be effected with no appreciable losses of cold and no long interruptions of the operation to permit thawing of the apparatus.

Characteristic features and advantages of the process according to my invention result from the following:

First, the employment of regenerators acting alternately as a cold exchanger and as a cold accumulator having a filling or packing consisting of e. g. laminæ of sheet metal; also, the periodically reversed operation in rapid sequence instead of the usual continuous operation of the cold exchangers of the countercurrent tubular type;

Secondly, the mode of operation, whereby a section of one of the regenerators is first charged with compressed air and another section with blown-in air, while upon reversal of the operation the oxygen returns through one section and the nitrogen through the other sections;

Thirdly, the arrangement of automatically closing and opening check-valves between the cold exchanger for low pressure blown-in gas mixture and the rectifier, on the one hand, and between the cold exchanger for the more highly compressed gas mixture and the condenser, on the other hand, whereby these valves prevent short-circuiting of the gas path between the cold exchangers and cause the gas mixture to flow through the rectifier and the condenser.

Variations may be resorted to within the scope of the appended claims without departing from the spirit of the invention. Thus it will be realized that instead of regenerators divided into a plurality of sections, there may be used a corresponding number of separate, independent regenerators; that the reversal of flow of the ingoing gas mixture and outgoing separated components may be effected either mechanically by various means or by manual operation; that either one or a plurality of cold separated components may be passed through the respective regenerative masses for chilling the same, but that at least one of such components shall be so passed; that the process while hereinbefore particularly described with respect to the separation of air into oxygen and nitrogen may be applied also for the separation of other gaseous mixtures into components, and that when so used the definitive conditions as to pressures, temperatures, times and conditions of rectification will have to be modified according to the gas undergoing treatment; that instead of the check valves other means for controlling the flow of gases from and to the rectifier may be used; that the rectification may be accomplished not only in a single stage rectification but there may be utilized a double or multiple stage rectification; and that the cold losses may be made up by means other than the introduction of a liquefied gas as, for example, increasing the pressure upon the ingoing gas mixture or by cold from a refrigerating machine which may be conducted to the regenerator as, for example, at about its middle portion.

It will be understood, therefore, that since certain changes in carrying out the above process and in the constructions set forth which embody the invention may be made without departing from its scope, it is intended that all matter contained in the above description or shown in the accompanying

I claim:

1. In a process for the separation of the components of gas mixtures, such as air, the steps which comprise separating a gas mixture into its components at low temperatures, passing the separated components in heat-exchange contact relation to the surface of regenerative bodies to transfer their cold to such bodies, and then passing a subsequent charge of the gas mixture in heat-exchange contact relation with the same surface of said bodies to be chilled by the cold stored in the latter.

2. In a process for the separation of the components of gas mixtures, such as air, the steps which comprise separating a gas mixture into its components at low temperatures and effecting cold exchange between the gas mixture and a regenerative body and between said body and the separated components by alternately reversing the flow of such mixture and components through each of a plurality of regenerators provided with metallic packing.

3. The method of separating components of gas mixtures, such as air, which comprises conducting a stream of such mixture under pressure and a separate stream not under pressure through regenerator sections operating as cold exchangers to chill such streams, passing the cooled compressed mixture in heat-exchange relation with a liquefied component of higher boiling point, whereby such compressed mixture is liquefied, passing the cooled uncompressed mixture in counter-current relation to said liquid mixture to be washed by the latter, whereby a lower boiling point component is driven off and a higher boiling component remains as a liquid, employing said last-mentioned liquid to liquefy fresh charges of cooled compressed mixture as aforesaid, conducting said components separately through the sections of a regenerator operating as cold accumulators to store up their cold therein, and then reversing and alternating the flow of said mixture and components through the regenerator, whereby the cold of the discharged, separated components is transferred to fresh charges of mixture.

4. The method of separating the components of gas mixtures, such as air, which comprises conducting a stream of such mixture under pressure and a separate stream not under pressure through regenerator sections operating as cold exchangers to chill such streams, passing the cooled compressed mixture in heat-exchange relation with a liquefied component of higher boiling point whereby such compressed mixture is liquefied, passing the cooled uncompressed mixture in countercurrent relation to said liquid mixture to be washed by the latter, whereby a lower boiling point component is driven off and a higher boiling component remains as a liquid containing a quantity of the lower boiling component, employing said last-mentioned liquid to liquefy fresh charges of cooled compressed mixture as aforesaid, driving off the lower boiling component from said last-mentioned liquid with vaporized higher boiling component, conducting said components separately through the sections of a regenerator operating as cold accumulators to store up their cold therein, and then reversing and alternating the flow of said mixture and components through the regenerator, whereby the cold of the discharged, separated, components is transferred to fresh charges of mixture.

5. The method of separating oxygen and nitrogen from air, which comprises conducting a stream of air under pressure and a separate stream not under pressure through regenerator sections operating as cold exchangers to chill such streams, passing the cooled compressed air in heat-exchange relation with liquid oxygen, whereby the air is liquefied, passing the cooled uncompressed air in counter-current relation to said liquid air to be washed by the latter, whereby nitrogen is driven off and a liquid rich in oxygen remains, driving off nitrogen from said liquid with gaseous oxygen, employing said liquid oxygen to liquefy fresh charges of cooled compressed air as aforesaid, conducting said oxygen and nitrogen separately through the sections of a regenerator operating as cold accumulators to store up their cold therein, and then reversing and alternating the flow of said air, oxygen and nitrogen through the regenerator, whereby the cold of the discharged oxygen and nitrogen is transferred to fresh charges of air.

6. Apparatus for the separation of the components of gaseous mixtures by regenerative refrigeration, comprising two regenerators having metallic packing therein, means for effecting separation of the components of a gaseous mixture by fractional evaporation, conduits for charging a warm mixture of gases to one regenerator, conduits for conducting away from the second regenerator the cold separated components, whereby the packing in said second regenerator is chilled by said outflowing components, connections between said means and the regenerators for conducting the chilled gas mixture into said means and the cold separated components into said regenerators, and means for periodically reversing and alternating the flow of gases through said regenerators, whereby each regenerator acts alternately as a cold accumulator to store up the cold of the outflowing separated components, and as a cold exchanger to give up the stored-up cold to the inflowing warm gaseous mixture.

7. Apparatus as set forth in claim 6, wherein the reversing means are located at the warm end of the regenerators.

8. Apparatus as set forth in claim 6, including, check-valves in said connections to prevent by-passing of the first-mentioned means by the gases in their flow from one regenerator to the other.

9. Apparatus for the separation of the components of gaseous mixtures by regenerative refrigeration, comprising two regenerators having metallic packing and each composed of two sections, means for effecting separation of the components of a gaseous mixture by fractional evaporation including a condenser, an evaporator, and a rectifier, conduits for feeding compressed and uncompressed gaseous mixture separately to the sections of one regenerator, conduits for separately conducting away from the second regenerator the separated components, connections between one section of each regenerator and the rectifier, connections between the other section of each regenerator and the condenser, means for conducting the liquefied gaseous mixture from the condenser to the top of the rectifier, reversing mechanism for periodically alternating the feed of gaseous mixture between the regenerators and causing reversal of gas flow through the latter, and check-valves located in said connections, whereby the compressed gaseous mixture is caused to flow first to the condenser and then to the rectifier, while the uncompressed mixture is caused to flow directly to the rectifier where it is washed by the liquefied compressed mixture, and the separated components are discharged through the second regenerator, and upon reversal the compressed and uncompressed mixtures are fed to the second regenerator and pre-cooled therein by the cold extracted from the separated components, separated into its components in the condenser and rectifier, and the components discharged through the first regenerator.

10. Apparatus for the separation of the components of gaseous mixtures by regenerative refrigeration, comprising two regenerators having metallic packing and each composed of three sections, means for effecting separation of the components of a gaseous mixture by fractional evaporation including a condenser, an evaporator, and a rectifier, conduits for feeding compressed gaseous mixture to two sections of one regenerator and uncompressed mixture to the third section, conduits for separately conducting away from the second regenerator the separated components, connections between said third section and corresponding section of the second regenerator and the rectifier, connections between the other sections of each regenerator and the condenser, means for conducting the liquefied gaseous mixture from the condenser to the top of the rectifier, a liquid component of higher boiling point being conducted to the condenser, the vapors of said component being conducted in heat-exchange relation with the enriched liquefied mixture discharging from the rectifier to be liquefied thereby and the lower boiling point component being simultaneously evaporated, reversing mechanism for periodically alternating the feed of gaseous mixture between the regenerators and causing reversal of gas flow through the latter, and check-valves located in said connections whereby the compressed gaseous mixture is caused to flow first to the condenser and then to the rectifier, while the uncompressed mixture is caused to flow directly to the rectifier where it is washed by the liquefied compressed mixture, and the separated components are discharged through the second regenerator, and upon reversal the compressed and uncompressed mixtures are fed to the second regenerator and pre-cooled therein by the cold extracted from the separated components, separated into its components in the condenser and rectifier, and the components discharged through the first regenerator.

11. In a process for the separation of the components of gas mixtures, the steps which comprise separating a mixture into its components at low temperatures, passing at least one of the separated components in heat-exchange contact relation with regenerative bodies to transfer its cold to such bodies, and then passing a subsequent charge of the gas mixture in heat-exchange contact relation with the same surface of said bodies to be chilled by the cold stored in the latter.

12. In a process for the separation of the components of gas mixtures, the steps which comprise separating a mixture into its components at low temperatures, passing at least one of the separated components in heat-exchange contact relation with the surface of regenerative bodies to transfer its cold to such bodies, and then passing a subsequent charge of the gas mixture in the opposite direction in heat-exchange contact relation with the same surface of said bodies to be chilled by the cold stored in the latter.

13. A process of separating air into nitrogen-enriched and oxygen-enriched components including, in combination, continuously chilling input air and continuously separating such air into cold nitrogen-enriched and oxygen-enriched components, simultaneously chilling said input air by flowing the same in one direction in intimate heat-exchange contact with a regenerative mass of large surface area, good heat conductivity and substantial heat storage capacity and chilling a separate similar regenerative mass by flowing one of said cold separated components in the relatively opposite direction in intimate heat-exchange contact therewith, and periodically changing the paths of said air and said component with respect to said masses so that each of the latter has an interval of chilling input air and another interval of being chilled by output separated component in rapid sequence.

14. A process of separating air into nitrogen-enriched and oxygen-enriched components including, in combination, continuously chilling input air and continuously separating such air into cold nitrogen-enriched and oxygen-enriched components, simultaneously chilling said input air by flowing the same in one direction in intimate heat-exchange contact with a regenerative mass of large surface area, good heat conductivity and substantial heat storage capacity and chilling a separate similar regenerative mass by flowing one of said cold separated components in the relatively opposite direction in intimate heat-exchange contact therewith, periodically changing the respective paths of input air and output component with respect to said masses so that each of the latter has an interval of chilling input air and another interval of being chilled by output separated component, and relating the frequency of such changes so that the outgoing temperature of said component from such masses is constantly near the entering temperature of the input air to said masses.

15. A process of separating gas mixtures into at least two components of different character including, in combination, continuously chilling an input gas mixture and continuously separating such mixture into two different cold components, said chilling being effected by first passing the input gas mixture in intimate heat-exchange contact with a chilled regenerative mass of large surface area, good heat conductivity and substantial heat storage capacity while simultaneously chilling a separate similar regenerative mass by flowing one of said cold separated components in intimate heat-exchange contact therewith, and then altering the flow of said gas mixture and said cold component to pass in intimate heat-exchange contact respectively with the other regenerative mass and in a direction opposed to the preceding flow past said mass, the alteration of the flow being repeated regularly at such periods that the coldest portions of said masses remain at a temperature approaching the entering temperature of said cold component while the outgoing temperature of said component closely approaches the entering temperature of said mixture.

16. A process of separating gas mixtures into components including, in combination, continuously chilling a gas mixture and continuously separating such mixture into cold components, said chilling being effected by flowing the gas mixture in one direction in intimate heat exchange contact with a regenerative mass of large surface area, good heat conductivity and substantial heat storage capacity, and simultaneously chilling a separate similar regenerative mass by flowing one of said cold components in intimate heat exchange contact therewith and periodically changing the paths of said gas mixture and said component with respect to the regenerative masses so that each of the latter has an interval of chilling input gas mixture and another interval of being chilled by outgoing separated components in rapid sequence.

In testimony whereof I affix my signature.

MATHIAS FRÄNKL.